US010501143B2

(12) United States Patent
Seagraves et al.

(10) Patent No.: US 10,501,143 B2
(45) Date of Patent: Dec. 10, 2019

(54) WHEEL RIM-MOUNTED REGENERATION COIL-MAGNET SYSTEM

(71) Applicant: Ford Global Technologies, LLC, Dearborn, MI (US)

(72) Inventors: Jamel Seagraves, Mountain View, CA (US); Chih-Wei Tang, Mountain View, CA (US); Sudipto Aich, Palo Alto, CA (US); Justin Carrus, Winchester, KY (US); David Gomez, St. Augustine, FL (US)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 15/649,199

(22) Filed: Jul. 13, 2017

(65) Prior Publication Data

US 2017/0305496 A1 Oct. 26, 2017

Related U.S. Application Data

(63) Continuation of application No. 14/630,999, filed on Feb. 25, 2015, now Pat. No. 9,771,124.

(51) Int. Cl.
*H02J 7/00* (2006.01)
*B62L 1/00* (2006.01)
(Continued)

(52) U.S. Cl.
CPC .............. *B62L 1/00* (2013.01); *B60L 1/006* (2013.01); *B60L 1/14* (2013.01); *B60L 7/10* (2013.01);
(Continued)

(58) Field of Classification Search
CPC ...... B60R 16/03; H02J 7/0052; B60L 11/007; B60L 11/1861; B60L 11/1862
See application file for complete search history.

(56) References Cited

U.S. PATENT DOCUMENTS

| 3,921,741 A | 11/1975 | Garfinkle et al. |
| 4,071,892 A | 1/1978 | Genzling |

(Continued)

FOREIGN PATENT DOCUMENTS

| CN | 203511875 U | 4/2014 |
| DE | 3911627 A1 | 2/1990 |

(Continued)

OTHER PUBLICATIONS

Search Report under Section 17(5) in corresponding international application No. GB1603014.0 dated Jul. 28, 2016, 5 pages.
(Continued)

*Primary Examiner* — Joseph M Rocca
*Assistant Examiner* — Michael R Stabley
(74) *Attorney, Agent, or Firm* — Gregory P. Brown; Brooks Kushman, P.C.

(57) ABSTRACT

A bicycle includes a frame, a charging circuit carried by the frame and configured to capture energy associated with movement of the bicycle, a power module carried by the frame, and a switch disposed electrically between the charging circuit and power module. The power module, in response to an indication that the bicycle is travelling downhill, closes the switch to enable energy transfer between the charging circuit and power module.

3 Claims, 3 Drawing Sheets

(51) Int. Cl.
*B62J 6/06* (2006.01)
*B62M 6/65* (2010.01)
*H02J 7/14* (2006.01)
*B60L 1/00* (2006.01)
*B60L 1/14* (2006.01)
*B60L 7/10* (2006.01)

(52) U.S. Cl.
CPC .................. *B62J 6/06* (2013.01); *B62M 6/65* (2013.01); *H02J 7/0052* (2013.01); *H02J 7/1407* (2013.01); *B60L 2240/642* (2013.01); *B60L 2250/12* (2013.01); *B60L 2250/16* (2013.01); *Y02T 10/7291* (2013.01); *Y02T 90/16* (2013.01)

(56) References Cited

U.S. PATENT DOCUMENTS

| | | |
|---|---|---|
| 4,095,663 A | 6/1978 | Gaffney |
| 4,111,274 A | 9/1978 | King et al. |
| 4,221,275 A | 9/1980 | Pennebaker et al. |
| 4,768,607 A | 9/1988 | Molina |
| 5,910,714 A | 6/1999 | Buchanan et al. |
| 6,039,137 A | 3/2000 | Schless |
| 6,155,369 A | 12/2000 | Whittaker |
| 6,247,548 B1 | 6/2001 | Hayashi et al. |
| 6,320,336 B1 | 11/2001 | Eguchi |
| 6,446,745 B1 | 9/2002 | Lee et al. |
| 6,874,592 B2 | 4/2005 | Yokotani et al. |
| 7,147,238 B2 * | 12/2006 | Oi .................. B62J 6/18 280/281.1 |
| 7,292,006 B2 | 11/2007 | Horiuchi |
| 7,570,012 B2 | 8/2009 | Dasgupta et al. |
| 7,628,518 B2 | 12/2009 | Fujii et al. |
| 7,658,247 B2 | 2/2010 | Carter |
| 7,692,409 B2 | 4/2010 | Schaper et al. |
| 7,723,956 B2 | 5/2010 | Tatebayashi et al. |
| 8,337,060 B1 | 12/2012 | Frankovich |
| 8,364,389 B2 * | 1/2013 | Dorogusker ....... A63B 24/0062 340/427 |
| 8,636,095 B2 | 1/2014 | Ito |
| 8,730,483 B2 | 5/2014 | Ikeda et al. |
| 8,803,398 B2 | 8/2014 | Takeuchi et al. |
| 8,868,253 B2 | 10/2014 | Hashimoto et al. |
| 8,922,785 B2 | 12/2014 | Oyama et al. |
| 9,061,731 B1 | 6/2015 | Do |
| 9,136,780 B2 | 9/2015 | Hosaka et al. |
| 9,236,761 B2 | 1/2016 | Strothmann |
| 9,701,356 B2 * | 7/2017 | Southey .................. B62J 99/00 |
| 2005/0253468 A1 | 11/2005 | Zampieri |
| 2008/0238367 A1 | 10/2008 | Guderzo |
| 2008/0314668 A1 | 12/2008 | Spanski |
| 2010/0301815 A1 | 12/2010 | Dai |
| 2011/0304288 A1 | 12/2011 | Saida |
| 2012/0133310 A1 * | 5/2012 | Lee ....... H02J 7/0024 318/139 |
| 2012/0200184 A1 | 8/2012 | Takeuchi |
| 2014/0062351 A1 | 3/2014 | Spelta et al. |
| 2014/0084819 A1 | 3/2014 | Hosaka et al. |
| 2014/0132155 A1 | 5/2014 | Strothmann |
| 2014/0367941 A1 | 12/2014 | Bez |
| 2016/0221627 A1 * | 8/2016 | Hines ....... B62H 5/20 |

FOREIGN PATENT DOCUMENTS

| | | |
|---|---|---|
| DE | 4109693 A1 | 10/1991 |
| EP | 1488991 A2 | 12/2004 |
| FR | 2715518 A1 | 7/1995 |
| GB | 2266418 A | 10/1993 |
| JP | H11139368 A | 5/1999 |
| JP | 2003040169 A | 2/2003 |
| KR | 100913501 B1 | 8/2009 |
| KR | 100940743 B1 | 2/2010 |
| TW | M418861 U | 12/2011 |
| WO | 0059769 A1 | 10/2000 |
| WO | 0200492 A1 | 1/2002 |

OTHER PUBLICATIONS

Search Report under Section 17(5) in corresponding international application No. GB1603014.0 dated Nov. 21, 2016, 3 pages.

* cited by examiner

WHEEL RIM-MOUNTED REGENERATION COIL-MAGNET SYSTEM

CROSS-REFERENCE TO RELATED APPLICATIONS

This application is a continuation of U.S. application Ser. No. 14/630,999 filed Feb. 25, 2015, now U.S. Pat. No. 9,771,124, issued on Sep. 26, 2017, the disclosure of which is hereby incorporated in its entirety by reference herein.

TECHNICAL FIELD

This disclosure relates to controlling and generating power for a vehicle such as a bicycle.

BACKGROUND

As the power demand for electronic devices and components on bicycles, as well as other human-powered vehicles, continues to increase, so does the desire for a user-generated power supply. Current systems may use a hub-mounted motor and a dynamo motor. However, higher efficiency systems are desired without the cost of hub-mounted motors and rolling resistance created by the current implementations.

SUMMARY

A bicycle power system includes a bicycle having a charging circuit, and a power module attached to the bicycle. The power module is configured to receive power from the charging circuit based on an operational state of the bicycle, and in response to an indication of a braking state, to establish an electrical connection between the charging circuit and power module to enable power transfer therebetween.

A bicycle includes a frame, a charging circuit carried by the frame and configured to capture energy associated with movement of the bicycle, a power module carried by the frame, and a switch disposed electrically between the charging circuit and power module. The power module is configured to, in response to an indication that the bicycle is travelling downhill, close the switch to enable energy transfer between the charging circuit and power module.

A bicycle system includes a bicycle having a charging circuit configured to capture energy associated with movement of the bicycle, and a power module attached to the bicycle. The power module is configured to, in response to an indication of a power demand from a device, close an electrical connector disposed electrically between the charging circuit and power module to enable power transfer therebetween.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Described herein is a power generation system for a vehicle, such as a bicycle or other human-powered vehicle. The system controls a switch connecting a charging circuit to a power module based on a current operational state of the vehicle. For example, the switch may automatically close upon recognizing a braking state or downhill state. The power module may also identify the operation state of the vehicle based on data such as acceleration and pedals-per-minute (PPM). In yet another example, user input may control the switch. When the switch is closed, the charging circuit is active and transmits generated power therein to the power module. The power module may in turn power certain devices in communication with the power module such as vehicle lights, motors, etc.

Figure 1:
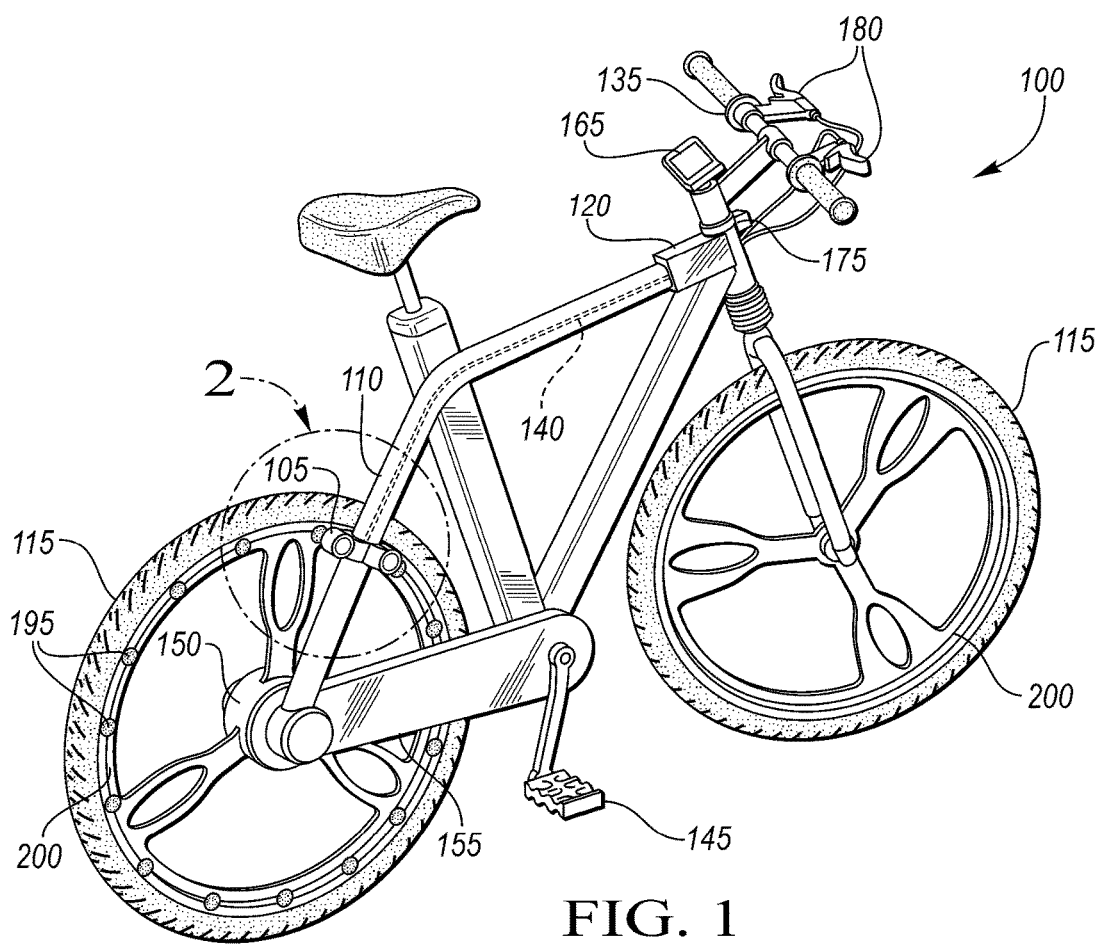
FIG. 1 illustrates a bicycle system.
Figure 3:
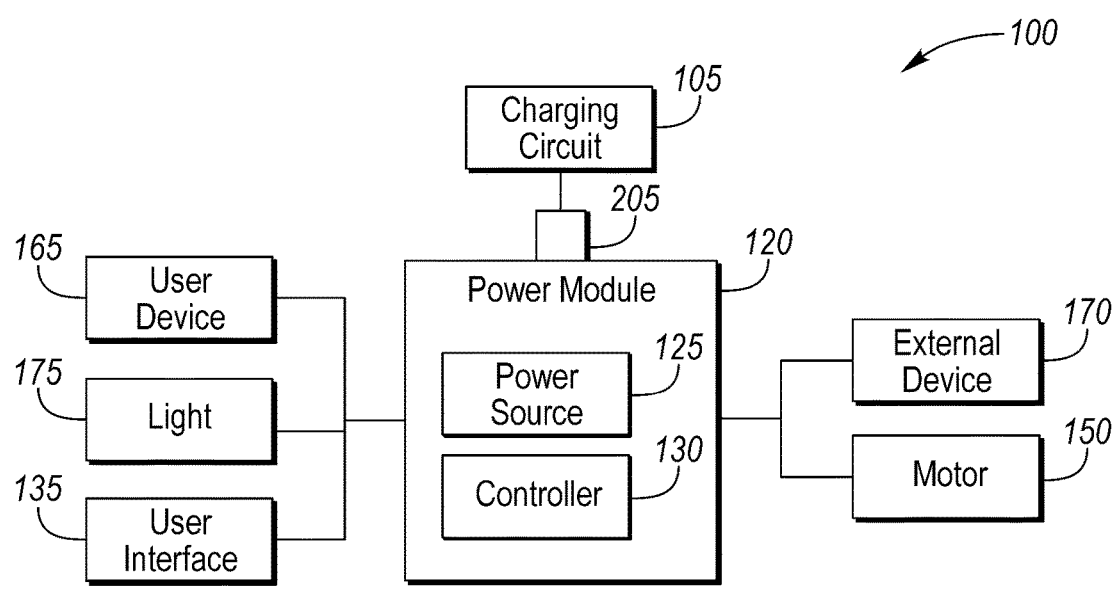
FIG. 3 illustrates a block diagram of the bicycle system.

FIG. 1 illustrates a bicycle system 100 (also referred to as bicycle 100) having a charging circuit 105 arranged at least in part on a frame 110 and two wheels 115 (rear wheel 115a and front wheel 115b). The system 100 may include a power module 120 which may include a controller 130 (as shown in FIG. 3) having a processor and a memory, as well as a rechargeable power source 125 (as shown in FIG. 3) such as a battery. The power module 120 may be connected to the charging circuit 105 via a wire 140. The module 120 may be in communication with a vehicle motor 150. The vehicle motor 150 may be configured to aid the user in driving the bicycle 100 by propelling the pedals 145, thus driving the chain 155 of the bicycle. While the charging circuit 105 is illustrated as being arranged at the rear wheel 115a, the charging system may also be arranged at the front wheel 115b.

The module 120 may be in communication with a user interface 135. The user interface 135 may include a mechanical mechanism such as a switch (as shown by way of example in FIG. 1.) The switch may be a simple switch having two position (e.g., on/off). The switch may also be a button, or plurality of buttons wherein the actuation of which may communicate user desires and commands to the module 120. The user interface 135 may also include a display configured to receive inputs or user commands from a user such as a touchscreen. The system 100 may include a docking mechanism (not shown) for a user device 165 such as a smart-phone, tablet, etc. Additional external devices 170 may also be arranged on the bicycle system 100. These external devices 170 may include one or more after-market device such as GPS units, digital audio plays (e.g., IPOD, etc.), odometers, etc. The external device 170 may be powered by the power module 120, or by other sources such the device's internal battery. The external device 170 may connect to the power module 120 via a wire at a port (not shown), such as a USB (universal serial bus) port. The bicycle 100 may also include other safety devices such as a light. Similar to the external device 170, the light 175 may be powered, at least in part, by the power module 120.

The bicycle 100 may also include a brake mechanism 180 that may be used by the user to apply the brakes to the wheels 115. The brake mechanism 180 may be in communication with the power module 120, specifically the controller 130. Upon braking, the charging circuit 105 may be activated so as to enable regenerative braking. This is discussed in more detail below.

The charging circuit 105 and the power module 120 may be in communication with each other via the wire 140. The wire 140 may include a switch 205, such as a transistor, that connects and disconnects the charging circuit 105 to the module 120. The switch 205 may be controlled by the controller 130. Additionally or alternatively, the switch 205 may be controlled by the user interface 135 and/or the brake mechanism 180. In this situation, an actuation at the brake mechanism may cause a deceleration of the bicycle 100 to activate the charging circuit 105.

Figure 2:
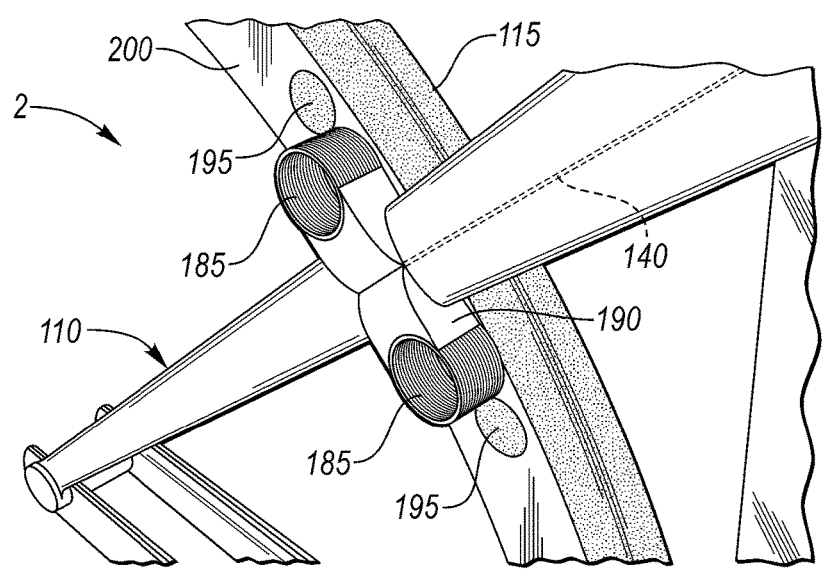
FIG. 2 is illustrates a partial perspective view of a charging circuit of the bicycle system.

FIG. 2 is a partial view of the charging circuit 105 of the system 100, specifically portion A of FIG. 1. The charging circuit 105 may include at least one coil 185 (shown as coils 185) within a coil housing 190. The coils 185 may be arranged on the frame 110 at a position that aligns with the one of the wheels 115. At least one magnet 195 is arranged on the wheel frame 200. As a user drives the bicycle 100 by pedaling, the wheels 115 rotate. As the wheels 115 rotate, the magnets 195 align with the coils 185 on the vehicle frame 110. As the magnets 195 align and pass the coils 185, a magnetic field is created between the coils 185 and the magnet 195 inducing current through the coils 185. The wire is connected to the coils the housing 190 and may transmit the current to the power module 120.

FIG. 3 is a block diagram of at least a portion of the system including the power module 120 connected to the charging circuit 105. The power module 120 may also connect with the external device 170, the user device 165, the light 175, motor 150 and the user interface 135. The power module 120, as explained, may include the power source 125 and the controller 130 configured to manage the power resources of the module 120. In one configuration, the controller 130 may open and close a connection or switch 205 between the power module 120 and the charging circuit 105. It may also be done via other mechanism. For the case of a two-stage toggle switch, the user may manually turn off the switch and thus completely disable the power generation before the ride. The switch 205 between the power module 120 and charging circuit 105 may be opened and closed automatically depending on certain conditions of the system 100. The switch 205 may also be controlled based on user preference. Examples of the power module control are described below.

Figure 4:
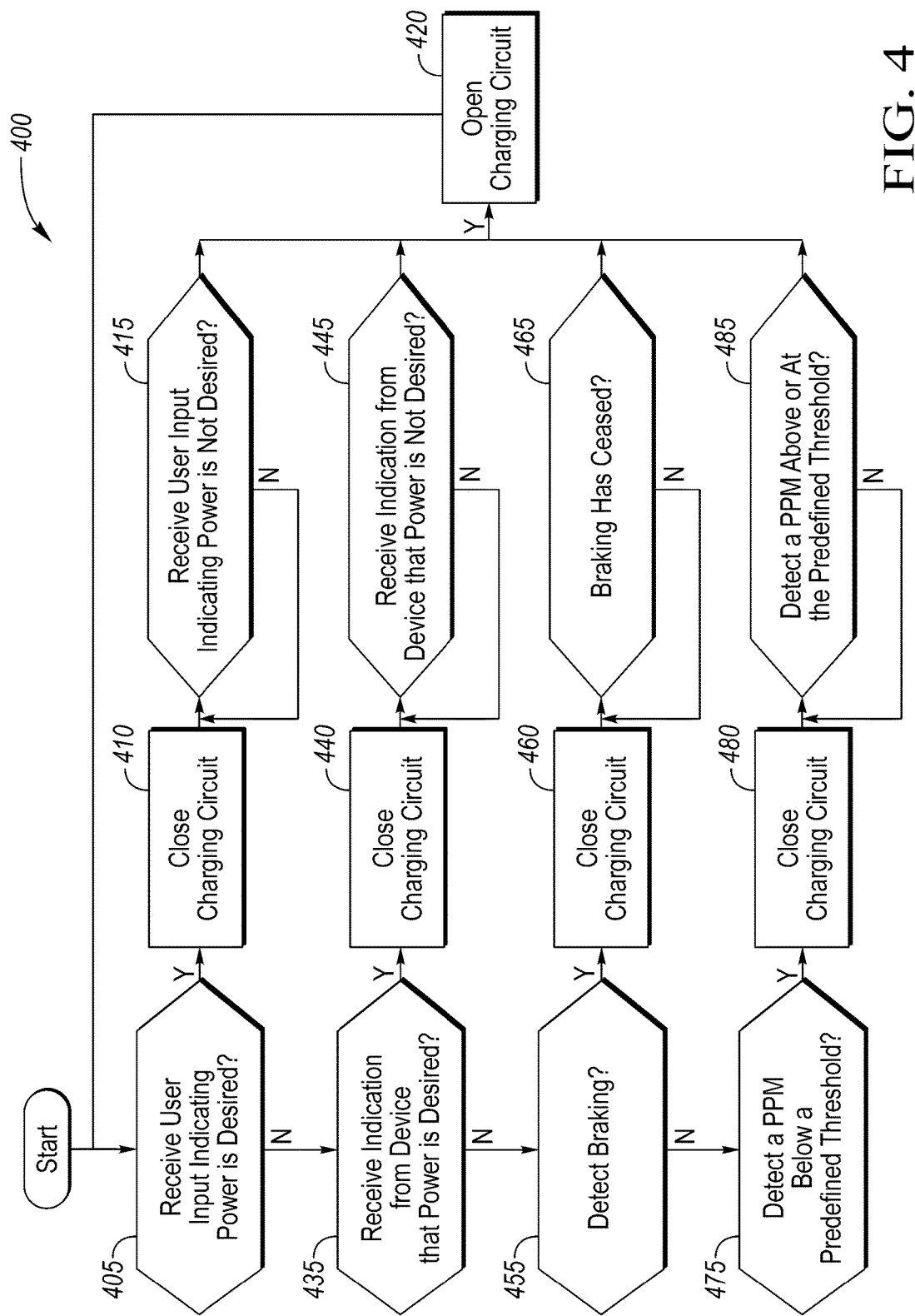
FIG. 4 illustrates a process for controlling power generation and use.

FIG. 4 illustrates a process 400 for controlling the power module 120 and more specifically for controlling the connection (e.g., switch 205) between the power module 120 and charging circuit 105. In some examples the switch 205 may be closed based user desire as well as based on power requirements of the devices within or on the bicycle 100 (e.g., blocks 405 and 425). In another example, the switch 205 may be closed based on the operational state of the bicycle (e.g., braking, accelerating, etc.) The operational state may be determined by data provided to the controller 130 (e.g., blocks 455 and 475).

The process 400 may begin at block 405 where the controller may determine whether user input has been received that indicates that power is desired. For example, the user may, via the user interface 135, instruct the power module 120 to receive power from the charge circuit 105. This may be the case when the user desires the motor 150 to receive electronic power from the power module 120. In another example, the user may wish to charge his or her mobile device (e.g., user device 165).

The process 400 may proceed to block 410 where the controller 130 may instruct the switch 205 to close. By closing the switch 205, current from the coils 185 may be transmitted from the charging circuit 105 to the power source 125 via the wire 140. The power module 120 may store the energy in power source 125. Any number of devices may then draw from the power source 125. For example, the motor 150 may draw from the power source 125, as well as the light 175.

At block 415, the switch 205 remains closed until a user input is received indicating that power is not desired from the power module 120.

At block 420, the controller 130 instructs the switch 205 to open, thus ceasing current flow to the power module 120.

At block 435, the controller 130 may determine whether a device, including the external device 170, light 175, motor 150, or user device 165, require power. The controller 130 may receive an indication from one of these devices in communication with the power module 120 that the specific device requires power. In one example, the device could have low stored power (e.g., the device's battery power is low). In another example, the device may be solely powered by the power module 120 and may have recently been connected to the power module 120. Thus, the controller 130 may recognize that a device requires power either by a device command sent directly from the device (e.g., data indicating low battery) and/or by recognizing a newly added device (e.g. plugging an external device 170 into the power module 120.) If the controller 130 recognizes such as need for power, the process 400 proceeds to block 440 where the switch 205 is closed until the need is no longer recognized at block 445 (e.g., data indicates that a device's battery power is no longer low and/or realizes that the external device requiring power has been unplugged from the power module 120).

At block 455, the controller 130 may determine whether or not the bicycle is braking. This determination may be made upon receiving a signal that the brake mechanism 185 has been actuated. If actuation of the brake mechanism 180 is recognized, the process proceeds to block 460 where the switch 205 is closed until braking ceases at block 465.

At block 475, the controller 130 may determine whether the pedal rotation rate (e.g., pedals per minute (PPM)) have fallen below a predefined rate. The PPM may indicate the state of the vehicle (e.g., traveling uphill, downhill, costing, accelerating, etc.) A low PPM may indicate that the bicycle 100 is traveling downhill or coasting. A low PPM may also be an indicator of braking. In these examples, the power module 120 may close the charging circuit at block 480 in order to take advantage of the regenerative braking. As an example, the threshold rate may be approximately 40 PPM. The charging circuit 105 may remain closed until the PPM exceeds the threshold rate in block 485. The PPM may be transmitted to the power module 120 from an external device 170 such as an odometer.

Additionally or alternatively, the power module 120 may receive an acceleration value from the odometer or accelerometer. Acceleration may also indicate the operational state of the bicycle 100. For example, a high acceleration may indicate downhill travel while a low acceleration may indicate uphill travel. Additional factors and data may also affect a determination with respect to the operational state of the bicycle. For example, both acceleration and pedal rotation rate (e.g., PPM), may be used. In this example, a low PPM with a high acceleration may indicate that the bicycle is traveling downhill or coasting. This would cause the switch 205 to close, as some resistance braking may be necessary. On the other hand, a high PPM and low acceleration, or speed, may indicate that the bicycle is traveling uphill. A high PPM and high acceleration may indicate steady state pedaling.

Rapid deceleration may also indicate braking. An actuation at the brake mechanism may cause a deceleration of the bike 100 to activate the charging circuit 105. Although not shown in FIG. 4, acceleration may also be used as an indicator to either open or close the switch 205, similar to PPM. For example, upon recognizing deceleration, the switch 205 may close, enabling the charging circuit 105.

Accordingly, the described systems may improve energy efficiency and reduce rolling resistance created by systems such as hub motors and dynamo motors. Further, the moving component (e.g., the wheels) has no mechanical connection with the non-moving component (the bicycle frame), causes little-to-no resistance, as well as eliminating unnecessary wear and tear on the vehicle. By controlling the switch 205 based on the state of the vehicle or user input, the power module may facilitate efficient energy regeneration.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A bicycle comprising:
a frame;
a charging circuit carried by the frame and configured to capture energy associated with movement of the bicycle;
a power module carried by the frame and selectively attached to an external device, the power module configured to, in response to an indication of an external device being connected to the power module, close an electrical connector disposed electrically between the charging circuit and power module to enable power transfer therebetween, wherein the power module is further configured to close the electrical connector in response to an indication of a braking state of the bicycle.

2. The bicycle of claim 1, the power module further configured to open the connector in response to the external device being disconnected from the power module.

3. The bicycle of claim 1, wherein the power module is further configured to close the electrical connector in response to receiving a user command from a user interface.

* * * * *